United States Patent [19]

Cox et al.

[11] Patent Number: 4,844,936

[45] Date of Patent: Jul. 4, 1989

[54] COHESIVE VEGETABLE PRODUCTS AND PROCESS FOR MANUFACTURE

[76] Inventors: James P. Cox; Jeanne M. Cox, both of 246 E. Bartlett Rd., Lynden, Wash. 98264

[21] Appl. No.: 105,293

[22] PCT Filed: Sep. 11, 1987

[86] PCT No.: PCT/US/8702292

§ 371 Date: Sep. 11, 1987

§ 102(e) Date: Sep. 11, 1987

[87] PCT Pub. No.: WO88/01836

PCT Pub. Date: Mar. 24, 1988

Related U.S. Application Data

[63] Continuation-in-part of Ser. No. 930,585, Nov. 13, 1986, abandoned.

[30] Foreign Application Priority Data

Sep. 11, 1986 [CA] Canada .................................. 517967

[51] Int. Cl.⁴ ............................................. A21D 13/00
[52] U.S. Cl. ..................................... 426/549; 426/516; 426/523; 426/524; 426/618
[58] Field of Search ................. 426/523, 549, 516, 93, 426/618, 462, 524

[56] References Cited

U.S. PATENT DOCUMENTS

| | | | |
|---|---|---|---|
| 2,914,005 | 11/1959 | Gorozpe | 426/516 |
| 3,071,471 | 1/1963 | Gorozpe | 426/462 |
| 3,365,299 | 1/1968 | Willock | 426/93 |
| 4,085,234 | 4/1978 | Kamada et al. | 426/618 |
| 4,101,683 | 7/1978 | Kamada et al. | 426/618 |

*Primary Examiner*—R. B. Penland
*Attorney, Agent, or Firm*—J. Robert Cassidy

[57] ABSTRACT

Powdered grain and/or legume material is mixed with a liquid binder containing algin to form a dough that is molded, or extruded and the extruded material severed, to form synthesized kernels or bits. Such kernels or bits are deposited in an edible boiling liquid, preferably containing calcium chloride and/or calcium lactate, for setting the binder, and cooked in such setting liquid for a few minutes after which they are removed from the setting or gelling liquid, rinsed, retrograded or set and stabilized in their cooked and expanded state as by freezing or the like, and dried; or they may be canned or frozen. As a consequence, the kernels or bits can be rehydrated and rendered instantly edible merely by the addition of an edible hot or cold liquid without requiring further cooking. The bits may contain other food ingredients and/or fortifying agents such, merely by way of example, as vitamins, minerals, proteins, amino acids, fats, oils, medicaments and/or flavorings or coloring materials.

3 Claims, 1 Drawing Sheet

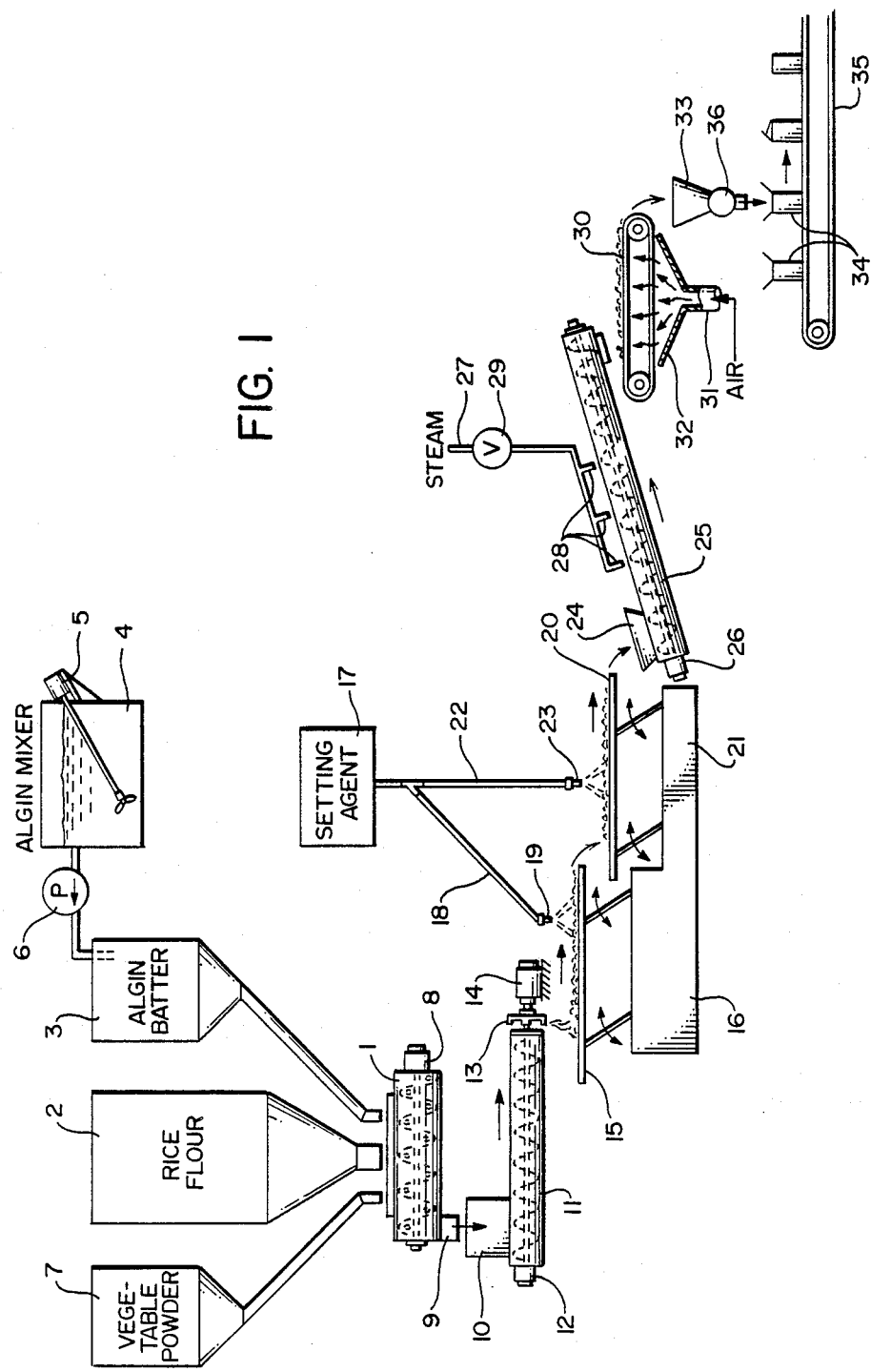
FIG. I

COHESIVE VEGETABLE PRODUCTS AND PROCESS FOR MANUFACTURE

RELATED APPLICATIONS

This application comprises, in the United States, a continuation-in-part of Applicants' co-pending U.S. application Ser. No. 930,585, filed Nov. 13, 1986, entitled: "Cohesive Powder Bit Vegetable Products And Process For Making The Same". Priority is claimed in part on Applicants' aforesaid U.S. application Ser. No. 930,585, now abandoned, and in part upon Applicants' corresponding Canadian application Ser. No. 517,967, filed Sept. 11, 1986, entitled: "Cohesive Powder Bit Vegetable Products And Process For Making The Same".

Applicants' aforesaid U.S. application Ser. No. 930,585 is a continuation-in-part of U.S. National Phase application Ser. No. 885,624, filed June 19, 1986, now abandoned, and designated in Patent Cooperation Treaty application PCT/US 85/01746, filed Sept. 11, 1985, published Mar. 27, 1986 under International Publication No. WO 86/01683, and claiming priority from Applicants' U.S. application Ser. No. 649,444, filed Sept. 11, 1984, now abandoned, all entitled: "Synthesized Kernel Grain or Legumes".

BACKGROUND OF THE INVENTION

1. Field of the Invention

This invention relates to a cohesive powder kernel or bit product composed of kernels or bits that have been formed from meal or flour of vegetables including seeds of cereals and/or seeds of pulses and/or leaves of leafy vegetables and/or stalk vegetables and/or root vegetables, which kernels or bits can be composed of a single variety of vegetable product or can incorporate products of more than one variety of vegetable and can include other types of food and/or edible material, yet which can be rehydrated and rendered instantly edible, without further cooking, merely by the addition of an edible liquid, either hot or cold.

2. Prior Art

The prior art is replete with patents relating to the formation of a wide range of food products from seed grains and/or other vegetable materials. Two of such prior art patents expressly disclose processes for preparing what are said to be quick-cooking rice products from broken grains of rice—viz., Gorozpe U.S. Pat. Nos. 2,914,005 and 3,071,471. The disclosures in the Gorozpe patents are more fully described in the aforesaid Related Applications and need not be further described herein. Suffice it to say that other than the concept of attempting to form a quick-cooking rice product from broken rice grains, the process steps employed by Gorozpe and the resulting food product bear no similarities to those of the present invention.

Another known prior art patent more fully described in the aforesaid Related Applications is Harrow et al U.S. Pat. No. 4,325,976—a patent which discloses a process for making a reformed rice product from flour which can include wheat flour, potato flour, corn flour, tapioca flour, waxy maize four and rice flour; but, it is preferred that at least a major portion of the flour be rice flour.

However, none of the foregoing prior art patents disclose a process in which alginate or other binder material in conjunction with a setting or gelling agent is combined with vegetable meal or flour to impart to such meal or flour a cohesive quality in the production of a powder kernel vegetable product; but, Willock U.S. Pat. No. 3,365,299 does propose the use of a seaweed gum or alginate mucilage coating for rice grains in producing a rice pudding.

Kamada et al. U.S. Pat. No. 4,101,683 discloses the use of alginate among other polysaccharides in connection with puffed rice. The process of this patent gelatinizes the rice starch by first puffing rice grains to a high degree. Such puffing and gelatinizing is accomplished by heating the rice grains in a closed container at an elevated temperature under increased pressure and releasing the rice grains into the atmosphere to allow them to puff, or heating the rice grains by means of heated air or by high frequency waves. Thereafter, a thickener is added to the puffed rice grains, which thickener may be polysaccharide, including agar and alginate, or gums including guar gum, or artificially produced thickeners, or microorganically produced thickeners. The thickener is applied to the puffed rice by immersing the puffed rice in an aqueous solution containing the thickener, or by spraying or sprinkling the aqueous solution on the puffed rice. Finally, the puffed rice, with which the thickener has been incorporated, is dried either under normal atmospheric pressure or under vacuum, either in the presence or in the absence of heating. In consequence of the gradual vaporization of water, the puffed rice diminishes in volume, eventually approaching the volume of raw rice. It is said that the resulting rice will be fast cooking in one to two minutes in hot water heated in advance to about 80° C. The rice can even be rehydrated at room temperature by being soaked in water for about 30 minutes.

While the process described in Kamada et al. U.S. Pat. No. 4,101,683 does not utilize any setting agent, the use of such an agent is disclosed in Kamada et al. U.S. Pat. No. 4,085,234. This patent discloses a rice product made by puffing rice to a high degree by first treating the rice grains in a closed container kept at an elevated temperature and releasing the rice grains into the atmosphere, thereby allowing them to puff to a degree from 6 to 16 times, and preferably 10 to 12 times, as large as the raw rice grains. The puffed rice grains are then immersed in, or sprayed or sprinkled with, an aqueous solution containing at least one polysaccharide thickener which is gelled by metallic ions. Examples of such polysaccharides are alginic acid, its salt, carrageenin, pectin, etc.

As in Kamada et al U.S. Pat. No. 4,101,683, the puffing step or this patent, Kamada et al U.S. Pat. No. 4,085,234, gelatinizes the rice starch. The puffing may expand the rice grains to a volume from six times as large as normal rice grains to as much as 15 times as large as ordinary rice grains. Also, a thickener such as sodium alginate can be applied externally on the puffed rice grains by immersing the puffed rice grains in a thickener solution, or by spraying the thickener onto the rice grains. After the thickener has been incorporated in the puffed rice grains the treated puffed rice is immersed in an aqueous solution containing metallic ions capable of inducing gelation of the thickener; or, alternatively, such a solution is sprayed or sprinkled on the puffed rice. The expression "aqueous solution containing metallic ions" includes aqueous solutions prepared by addition of metallic salts, solutions prepared by an ion exchange treatment, naturally occurring mineral waters containing metallic ions, and natural aqueous solutions which originate in animals and plants. Various metallic salts are described in the Kamada et al patents, including calcium salts, potassium salts, magnesium salts and other similar metallic salts of carbonic acid, hydrochloric acid, sulfuric acid, phosphoric acid, acetic acid, lactic acid, citric acid, ascorbic acid, glycerophosphoric acid and other similar acids. The metallic ions are stated to be capable of acting upon the thickener to be gelled and consequently inducing gelation. A specific example is the combination of sodium alginate and calcium lactate. Another example is a low methyl ester pectin and calcium chloride. A further example uses the combination of sodium alginate and calcium lactate. Another example proposes the combination of calcium and postassium-sensitive carrageenin and calcium lactate.

After the rice has been treated with the thickener and the metallic salt, the puffed rice into which the thickener or the gelled thickener has been incorporated is dried under normal atmospheric pressure or under vacuum either in the absence or in the presence of heating to produce a fast-cooking rice. During the drying step the puffed rice diminishes in volume to approach the volume of raw rice, while the incorporated gelled thickener is retained throughout from the surface to the inside center of the individual grains.

SUMMARY OF THE INVENTION

Improved synthesized cohesive vegetable products which can be rehydrated and rendered instantly edible, without further cooking, merely by the addition of a hot or cold edible liquid, are formed in accordance with the present invention by: (i) grinding, crushing or otherwise pulverizing or comminuting vegetable material including grain seeds which may be defective, such as being broken, cracked or misshapen; (ii) mixing the meal or powder with water and a settable binder to impart to it a cohesive paste-like doughy quality; (iii) forming the cohesive paste-like powder mixture into reconstituted or synthesized powder kernel shapes or bits, such as by compression die molding of the cohesive paste-like powder or by extruding the cohesive paste-like powder in dough form into strings and cutting these strings into reconstituted or synthesized kernels or bits; (iv) heating, and preferably gelatinizing, the reconstituted or synthesized kernels or bits by, for example, depositing such kernels or bits in boiling water containing a suitable metallic salt setting agent and cooking such kernels or bits until expanded; (v) rinsing the expanded kernels or bits so as to remove excess setting agent and cool the kernels or bits; (vi) retrograding the expanded kernels or bits by, for example, freezing to set the product in its expanded state; and (vii), drying the retrograded kernels or bits to reduce their moisture content to on the order of approximately 12% moisture content by weight.

Because the vegetable matter is ground, crushed or otherwise pulverized or comminuted in the initial step of the process, it becomes possible to add any selected fortifying agent to the ingredients which form the batter. Thus, for example, it is entirely possible to fortify the product by adding any one or more of fortifying agents selected from the group consisting of: (a) vitamins; (b) minerals; (c) proteins; (d) amino acids; (e) fats; (f) oils; (g) medicaments; and (h), flavorings. Thus, the finished product, if fortified, is not only capable of being rehydrated and rendered instantly edible merely by the addition of a hot or cold edible liquid; but, additionally, it can provide all or any selected portion of the daily dietary requirements for human beings.

BRIEF DESCRIPTION OF THE DRAWING

FIG. 1 is a diagrammatic representation of portions of an apparatus suitable for performing certain steps of a process according to the present invention to produce products according to the present invention.

DETAILED DESCRIPTION

In this description, the term powder kernel or bit is used to designate kernels or bits synthesized from powder including a binder. Reconstituted kernels may simulate whole natural cereal seeds such as of rice, wheat, oats, millet, corn, rye and barley, or pulse seeds such as of peanuts, peas and beans including kidney beans, lima beans, lentils and soy beans. Synthesized bits can be produced from legumes or leafy plants such as of vetch, alfalfa, clover, spinach and pea pods, or stalk vegetables such as corn, tomatoes and green peppers, or root vegetables such as carrots, turnips, beets, onions and potatoes. Special combination synthesized kernels, which may or may not simulate whole natural seeds or bits, can be composed of a blend or mixture of powders from different vegetables, other foods, flavorings and other edible materials. Such other foods include cheese, pasta, milk, sugar, oil or fat, such as lard, butter, coconut fat or olive oil, honey and nuts, for example, filberts, walnuts, pecans, cashews, coconut and Brazil nuts. Flavorings include curry, chili powder, soya sauce or other soya derivatives, salt, vanilla, ginger, pepper, thyme, saffron, sage, cinnamon, cloves, garlic, onion and origanum. Salt should be used sparingly because any appreciable amount of salt will detract from the cohesion promotion of algin when used as a binder.

It is preferred that the kernels or bits be synthesized from powder having particles small enough to pass through a No. 10 U.S. standard mesh screen but which would be retained on a No. 300 U.S. standard mesh screen, preferably being predominantly about 100 mesh.

In this description "reconstituted" is used to designate kernels composed essentially, if not entirely, of powder from one specific type of grain seed or pulse seed of a shape very similar to, if not identical to, the shape of the corresponding whole natural seeds, whereas the term "synthesized" is used as generic to reconstituted kernels and also to bits of other foods or special combinations resulting from a mixture of powders of different seeds and/or other vegetable and/or food components and may or may not be of a shape similar to the shape of some natural seed. The term "bits" is used generically to cover kernels, cubic or cylindrical pellets, flakes and morsels of other shapes synthesized from powder.

Moreover, "synthesized" is applied to powder bits having a substantial amount of spices, flavoring, medicaments or pharmacological food mixed in with one or more varieties of vegetable components. The proportions of components in such special combination synthesized bits may be such as to provide in a single powder food product proper proportions of vegetable ingredients to sustain life such as may be used for a complete obesity control diet or a diabetic diet.

The process of producing powder bits includes crushing, including grinding, or comminuting selected cereal seeds, legume or pulse seeds, or other vegetable material to a powder such as meal or flour, making a liquid binder such as a batter or a paste, fixing such liquid binder with the vegetable powder to form a doughy material of consistency suitable for extruding, extruding such doughy material through dies to form strings, severing such strings into kernels or other bits, and treating such kernels or other bits with a binder-setting agent such as a calcium salt adequate to set the binder incorporated in the kernels or other bits and drying the bits. Preferably the doughy material is extruded twice to increase the density and homogeneity of the strings. The powder bits thus produced can be reconstituted kernels of the type having a shape resembling the shape of the seeds of a particular grain or pulse from which the vegetable powder for making the kernels came, such as kernels shaped like rice grains made from rice powder, or kernels shaped like beans made from bean powder, for example.

Instead of being extruded, the kernels or bits can be synthesized in the form of rice kernels or other shapes by being formed in a die. The bits can be treated with a liquid binder incorporating low viscosity algin and fat, such as by being sprayed with such a binder while bits are moving across a vibrating table or moving as a fluid bed. Subsequently the bits can be similarly sprayed with a solution of binder-setting agent and air dried.

The liquid binder mixed with the powder from which the bits are made provides a cohesive powder mixture forming bits that will retain their shape well despite wide variations in moisture content and temperature.

The binding material for the cohesive powder preferably is an algin such as sodium alginate. The algin can be of any viscosity including the low viscosity type from 1/10th to 1 poise and the high viscosity type from 8 to 20 poises. If the algin is of the low viscosity type, the liquid binder may be principally water, containing 0.1 percent to 20 percent by weight of algin, preferably 5 percent to 11 percent. If high viscosity algin is used in the binder, the water may contain from 0.01 percent to 12 percent of algin by weight, preferably 0.5 percent to 6 percent.

Alternatively, the binder material may be chitin material such as chitosan, chitosamine, chitose or other chitin derivative from fungi and/or crustacean shells.

Whatever type or types of binding material are unitilized in the liquid binder, the total amount of binding material should be within the range of 0.01 to 20 percent of the water by weight.

In producing synthesized bits, whether reconstituted kernels of a single type of grain or pulse or other bits of a special composite type, the liquid binder can be mixed with the powdered material of the seed, whether grain, pulse, or other food, to make a cohesive powder dough of soft consistency suitable for extruding in proportions of 2 to 4 times as much bit-forming powder as liquid binder by volume, preferably about 3 times as much.

For making rice kernels, rice powder and liquid binder may be extruded by a press type of extruder such as that disclosed, for example, in Gorozpe U.S. Pat. Nos. 2,914,005 and 3,071,471, or in Harrow et al U.S. Pat. No. 4,325,976.

In carrying out the present invention, the extruded synthesized kernels fall from the extruder into a body of boiling water containing binder-setting or binder-gelling material which preferably is a water-soluble calcium salt, such as calcium chloride $CaCl_2$ or calcium lactate $(CH_3CHOHCOO)_2$ $Ca.5H_2O$, and preferably a combination of these two chemicals; but, other water-soluble calcium salts could be used instead such as those more fully identified in the aforesaid Related Applications.

The preferred setting agent is composed of calcium lactate, 62.5 percent, and calcium chloride, 37.5 percent, by weight. The amount of calcium salt may be within the range of 0.01 to 20 percent of the ground vegetable material by weight, preferably about 12 percent. Such solution, when sprayed onto the kernels or bits, sets or gels the binder so as to form a cohesive powder for producing firm, coherent, stabilized bits. If the kernels or bits are deposited in a setting bath of hot, preferably boiling, aqueous solution, such solution should be somewhat acidic, such as having a pH of 4 to 6, to keep the calcium in solution. Acids such as lactic acid or adipic acid can be used to produce such acidity.

If it should be desired to retard or prolong the effect of the setting or gelling agent, sodium carbonate $Na_2CO_3$, sodium citrate $Na_3C_6H_5O_7$, disodium phosphate $Na_2HPO_4$, trisodium phosphate $Na_3PO_4$, sodium hexametaphosphate $(NaPO_3)_6$, tetrasodium pyrophosphate $Na_4P_2O_7$, sodium polyphosphate $Na_{n+2}P_nO_{3n+1}$, or sodium tripolyphosphate $Na_5P_3O_{10}$ in an amount of 0.01 percent to 20 percent by weight can be included in the liquid binder.

Another procedure for deferring or extending the setting or gelling action of calcium is to utilize calcium carbonate or calcium sulfate as the source of calcium and restrict the access of acid such as acetic acid, adipic acid, citric acid, fumaric acid, gluconic acid, glutaric acid, lactic acid, malic acid, succinic acid or tartaric acid or d gluconolactone $C_6H_{10}O_6$ to react with the substantially insoluble calcium salt for producing soluble calcium salt slowly.

If chitin material is used for the liquid binder, sulfuric acid or phosphoric acid or calcium ions or magnesium ions will set or gel the binder.

In carrying out the present invention in accordance with a prefered embodiment thereof, kernels discharged from the extruder are preferably deposited into boiling water and cooked for a period of on the order of from 3 to 20 minutes so as to heat—and, preferably, fully gelatinize—the starch contained in the product and to expand the kernels. Such boiling water can contain the binder-setting agent. The kernels are then removed from the boiling water, rinsed, drained and conditioned for storage. Such conditioning preferably takes the form of retrograding the expanded kernels so as to stabilize and solidify the kernels in their expanded state. This can be accomplished by freezing the kernels, rapid momentary surface heating at a temperature ranging from about 15520 F. to about 185° F. or, alternatively, by the use of chemical additives such, for example, as alcohol; or mechanically by permitting the product to sit in chilled water for extended periods of time and/or by canning the product without excess moisture. Following retrograding, and in those instances other than a canning process, the product is preferably dried to reduce its moisture content to on the order of from 10% to 13% moisture by weight.

EXAMPLE

A representative example of a process for making a quick-cooking, reconstituted rice grain product capable of rehydrating in one minute is the following formulation:

Formable Dough 7,500 grams of rice flour milled from whole and broken grains of rice were mixed with 127.5 grams of low viscosity sodium alginate dry powder Kelco Gel LV, 125 grams of peanut oil used as a lubricant, 25 grams of lecithin used as an antioxidant, and 65.6 grams of dry albumin. The foregoing ingredients were thoroughly blended in a vertical dough mixer for 10 minutes. 2,250 grams of water was then added to the flour mixture and remixed in the vertical dough mixer for 5 minutes, thus forming

Extrusion

The doughy material was then extruded through a pressure extruding press with a standard Risso or rice-shaped die and cut at intervals so as to form rice-like kernels.

Gelatinization

Following extrusion, the reconstituted rice kernels were dropped into a body of boiling water containing 0.6 grams of calcium chloride and 1.0 grams of calcium lactate per 400 grams of water. The reconstituted rice kernels were then cooked for approximately 9 minutes, or until completely gelatinized—complete gelatinization has generally been found to occur within about 8 to 10 minutes. The calcium salts served as a gelling agent for the alginate.

Rinsing/Cooling

The gelatinized, reconstituted rice kernels were then drained and thoroughly rinsed in cool water until all excess setting agent had been removed and the kernels had been cooled to approximately room temperature.

Retrograding

The cooled, reconstituted rice kernels were then retrograded, or stabilized, and solidified in their expanded state by depositing in a freezer and permitting the kernels to be thoroughly frozen.

Drying

The frozen, reconstituted rice kernels were then dried on a heated forced-air dryer at 120° F. for approximately 7 hours, or until the reconstituted rice kernels reached a 12% by weight moisture content—6 to 8 hours drying appears to be desirable.

Utilizing this representative process, the resulting rice kernels were found to be completely rehydratable and edible within one minute of the addition of an edible liquid such, for example, as hot or cold water or milk.

The foregoing experiment was repeated using both glutinous and long grain rice without observing any appreciable difference in the rehydration characteristics of the final product. It has been found that full gelatinization can be attained in other ways such, for example, as by steaming and/or microwaving. The setting agent can be applied to the product either before, during or after gelatinization, for example, by spraying. Moreover, it has been found that the gelatinized, reconstituted rice kernels can be retrograded in other completely conventional manners such as by the use of chemical additives such, for example, as alcohol. Alternatively, the product can be retrograded by rapid momentary surface heating at a temperature ranging from about 1552 F. to about 185° F., or by sitting in chilled water for extended periods of time, or by canning the product without excess moisture. In each instance, the product is retrograded by permitting the starch to precipitate and assume a solid form. Other methods of drying may be employed to expedite or slow the drying process such as by utilizing a microwave oven or a cool air drying process.

Flavoring, nutrients, fortifying substances and/or color can be added to the vegetable meal or flour and binder liquid mix dough before being extruded; and, such additions will permeate the dough thoroughly and uniformly. Such uniform permeation will persist in the synthesized bits instead of being applied to the powder bits as a coating. For example, 20 percent to 35 percent of the dough mix by volume could be cheese, or 1 to 5 percent, preferably 2 percent, of the dough by volume could be oil or fat. Other types of additives can be included in proportions from 5 percent to 30 percent of the dough by volume, depending on the ingredients used and the color or flavor desired. Flavors can be added in an amount from 0.01 percent to 20 percent. Other food products which can be added in an amount up to 50 percent by volume include coconut, albumin such as egg, milk and sugar. Also 3 percent to 10 percent of monosodium glutamate by volume, preferably 6 percent, can be included to enhance the flavor of food ingredients other than rice.

If the powder kernel product being produced is rice or predominantly rice, it is desirable for at least some albumin to be used because albumin restores a strong natural flavor to the rice. The albumin may be in the form of fresh or dried whole egg albumin. The amount of albumin used should be equal to 1 percent to 20 percent, preferably 12½ percent of the amount of water in the fluid binder by weight, which albumin can be supplied at any stage during the kernel-forming process.

Vitamins, minerals, proteins, and/or amino acids can be added to various grain seeds and/or pulse seeds and/or other vegetable material in producing the synthesized powder bits, especially for deprived people. The powder bits are substantially homogeneous and can constitute a complete food complex incorporating properly balanced proportions of carbohydrate provided by the grain or pulses, protein, fat and/or oil.

In some instances discretion must be used in selecting materials to be used by the body for producing proteins for incorporation in the synthesized bits of the present invention. Proteins are peptides made up of two or more amino acids covalently bound in an amide linkage. Thus, a peptide is a chain of amino acid residues. All amino acids contain nitrogen, and sometimes the body has an oversupply of nitrogen. In such cases, instead of using amino acids as such, amino acid analogues from which nitrogen has been completely or principally removed can be utilized. Suitable keto- and hydroxy-analogues which are free of nitrogen corresponding to essential and beneficial amino acids can be used in place of the corresponding amino acids themselves. In such instances the analogue will combine with the excess nitrogen of the body to serve the dual function of enabling the body to produce proteins and of removing some of the nitrogen from undesirable forms in the body. Such amino acids and their corresponding keto-analogues and hydroxy-analogues are listed below.

| ESSENTIAL AMINO ACIDS AND ANALOGUES | | |
|---|---|---|
| Amino Acid | Keto-analogue | Hydroxy-analogue |
| L-leucine | a-ketoisocaprioc acid | |
| L-valine | a-ketoisovaleric acid | |
| L-isoleucine | (R,S)-a-keto-b-methylvaleric acid | |

-continued

| | | |
|---|---|---|
| L-lysine | | |
| L-phenylalanine | phenylpyruvic acid | L-phenyllactic acid |
| L-threonine | | |
| L-methionine | a-keto-g-methiol-butyric acid | (D,L)-a-hydroxy-g-methiol-butyric acid |
| L-tryptophan | indolepyruvic acid | indolelactic acid |

| BENEFICIAL AMINO ACIDS AND ANALOGUES | | |
|---|---|---|
| Amino Acid | Keto-analogue | Hydroxy-analogue |
| L-histidine | imidazolepyruvic acid | imidazolelactic acid |
| L-tyrosine | P-hydroxyphenyl-pyruvic acid | L-p-hydroxyphenyl-lactic acid |
| L-cystine | BB'-dithiopyruvic acid | L-BB'-dithiodi-lactic acid |
| L-cysteine | B-mercaptopyruvic acid | L-B-mercaptolactic acid |
| L-arginine | | |
| L-ornithine | | |

Any of these amino acid and analogue structures in any combination and in appropriate quantities can be mixed into the powder material from which the bits are synthesized in accordance with the present invention.

For people with excessive nitrogen or ammonia in the body, such as those suffering from hyperammonemia and portal systemic encephalopathy, the amino acids ornithine and arginine may be incorporated in the bits.

By incorporating a proper type and proportion of amino acids or their analogues in the powder material from which the powder bits of the present invention are synthesized, a properly balanced diet is assured simply from consumption of the bits of the present invention. To make a complete food complex, an appropriate amount of oil and/or fat can be incorporated in the material used for preparation of the bits.

Rice, corn, millet, wheat and potatoes, for example, are excellent sources of carbohydrate, particularly for reducing diet or diabetic diet purposes or for patients with hypoglycemia or hyperglycemia. Digestion of rice requires considerable time so that the carbohydrate is converted into sugar usable by the body over a period of several hours instead of being available to the bloodstream quickly, such as in a period of less than an hour, as is the case with sugar or compounds readily converted into sugar by the body. Digestion of carbohydrate from corn or potatoes can be retarded by providing such food ingredients in the form of synthesized kernels. By associating protein, amino acid or amino acid analogue and, if desired, oil and/or fat intimately with carbohydrate, all of the components become available for body building over an extended period of time instead of quickly. Such result can be achieved by incorporating the amino acid or analogue with powdered rice and, if desired, with an appropriate amount of oil or fat in the dough from which the synthesized rice grains are extruded.

A representative extrudible dough could contain the following ingredients by weight in addition to the binder and flavoring, if any:

| | |
|---|---|
| carbohydrate | 25% to 99% |
| protein | 1% to 75% |
| oil or fat | up to 50% |

A preferred formula would have the following proportions of ingredients by weight:

| | |
|---|---|
| carbohydrate | 75% |
| protein | 20% |
| fat | 5% |
| Total | 100% |

Because each powder bit provides a complete balanced food in itself, a diet supplying any desired number of calories can be specified by simply prescribing the proper quantity of the synthesized rice.

For an adult of average size, *Van Nostrand's Scientific Encyclopedia, Sixth Edition,* states on page 2339, at column 1, under the definition of Protein that the daily requirement is 70–80 grams of protein. Actually, the bodily requirement depends on the size of the person, and it is perhaps more accurate to state that the daily bodily requirement for protein is 0.7–0.8 grams of protein per kilogram of body weight.

Thus, for example, if a low fat diet containing 2,400 calories per day were desired, the amount of synthesized rice to be eaten during the day could be 590 grams, containing 560 grams of carbohydrate, 25 grams of protein and 5 grams of fat. A higher fat diet providing 2,400 calories could be 520 grams of synthesized rice, containing 400 grams of carbohydrate, 70 grams of protein and 50 grams of fat.

Amino acids and their analogues have very unpleasant tastes; and, consequently, it may be desirable to add pleasant flavoring materials to the powder kernels such as curry, coconut or chili powder, as suggested above, where amino acids or their analogues are incorporated in the kernels. The powder kernel grain or pulse product would, however, be available in a form which was familiar and to which deprived people are accustomed. Moreover such powder kernel product would be particularly beneficial because it can be prepared for consumption quickly and with minimal, if any, energy requirements.

Apparatus

Referring to FIG. 1, there has been shown an exemplary apparatus suitable for performing certain of the foregoing steps. Thus, as here shown, the apparatus includes a mixer 1 which may, for example, be of the helical screw type, to which mixer can be supplied powdered grain seed, such as rice flour, from a storage hopper 2 and binder, such as aqueous algin batter, from a storage hopper 3. Such algin batter is produced by mixing algin such as sodium alginate with water in a container 4. The mixing can be accomplished by a motor-driven impeller 5. The algin batter is pumped from the mixing container 4 to the storage hopper 3 by a suitable pump 6 which can be a diaphram pump or an impeller pump.

As described above, one or more types of vegetable powder in addition to the principal grain flour supplied from the storage hopper 2 can be supplied to the mixer 1. Such additional vegetable powder could, for example, be pulse powder, such as bean powder, or other vegetable powder, such as corn meal. Such an additional vegetable powder ingredient can be supplied to the mixer 1 from the storage hopper 7.

The mixer 1 may contain a helical screw rotated by the motor 8 to serve the dual purpose of mixing the ingredients in the mixer and conveying the resultant mixture to one end of the mixer for discharge through a discharge spout 9 into the inlet conduit 10 of a further helical screw mixer 11, the screw of which is driven by a motor 12. This mixer serves the dual purpose of further mixing the ingredients supplied to the mixer 1 and of feeding the mixture to an extruder 13 at the end of the mixer opposite the motor 12. Such extruder is rotated by a motor 14 and effects both shaping of kernels or bits and cutting them to length so as to resemble a natural kernel of some particular grain or pulse or a bit of predetermined shape. The extruder 13 may be a Risso die extruder.

As shown in FIG. 1, the kernels or bits extruded from the extruder 13 fall on the tray 15 of a harmonic conveyor 16 such as disclosed in U.S. Cox Pat. No. 3,817,370. The kernels or bits on this conveyor can be sprayed with setting agent for setting the binder. Such setting agent may be stored in a storage tank 17 from which the setting agent can be dispensed through a conduit 18 and a spray nozzle 19 that will spray the setting liquid solution or suspension onto the kernels or other bits received on the tray 15.

Alternatively, in the practice of the present invention the kernels or bits extruded from the extruder 13 may be deposited into a tank, or other container, of boiling water (not shown) which preferably contains the setting agent. In such a system, after the kernels or bits are fully gelatinized—a process which generally takes from 8 to 10 minutes residence time in the boiling water, but which can, in some instances, vary from 3 to 20 minutes—the kernels or bits are removed from the boiling water, drained and rinsed so as to cool the kernels or bits and remove any excess setting agent therefrom. The thus drained, rinsed and cooled kernels or bits are then retrograded in their expanded state by, for example, freezing in a conventional freezer, rapid momentary surface heating at a temperature ranging from about 155° F. to about 185° F. or, alternatively, by completely conventional chemical or mechanical means as previously described. Finally, the product is dried in any suitable or conventional fashion so as to reduce its moisture content to on the order of from 10% to 13% moisture by weight.

However, where an apparatus such as shown in FIG. 1 is employed, the kernels or bits exiting from the extruder and deposited on the tray 15 may be moved along the tray 15 by oscillating the latter until the material thereon spills off its right end as viewed in the drawing onto the tray 20 of the next harmonic conveyor section 21. Additional setting agent supplied through a conduit 22 from the setting agent storage tank 17 may be sprayed onto the kernels or other bits on the tray 20 by the nozzle 23. Oscillation of the tray 20 will convey the material on it to the right as viewed in the drawing until it spills off the right end of such tray into the receiving hopper 24 of the helical screw conveyor 25 driven by motor 26. As the kernel or other bit material is conveyed along the conveyor 25, it can be subjected to jets of superheated steam supplied by pipe 27 and discharged into the conveyor by nozzles 28 for the purpose of cooking or gelatinizing the product. The amount of steam thus supplied can be controlled by adjusting valve 29; while the time during which the bits in conveyor 26 are subjected to the steam is determined by the speed of the motor 26 and the pitch and length of the conveyor helix.

The steam-treated bits are, as shown in FIG. 1, discharged from the discharge end of conveyor 25 onto a reticulated belt conveyor 30. As the material is being transported by that belt, it can be subjected to a stream of air supplied through the duct 31 to the plenum chamber 32 beneath the belt, which air may be heated or unheated depending upon the speed and length of the belt 30 and the amount of drying action which it is desirable to accomplish by the air. Of course, those skilled in the art will appreciate that where it is desired to retrograde the steam heated kernels or bits discharged from conveyor 25, such bits can, prior to deposit on conveyor 30, be frozen or chemically or mechanically retrograded in the manner previously described.

Finally, from the conveyor 30 the bits are either transported to suitable storage facilities or they may be packaged immediately by being deposited into a hopper 33 located above packaging containers 34 on a belt 35. A measuring valve 36 can dispense from the hopper 33 a quantity of material just sufficient to fill a container or carton 34 as it passes beneath or pauses beneath the hopper 33. Conventional automatic equipment can be provided for closing and sealing the cartons 34 after they have been filled with the bit product of the present invention.

I claim:

1. A process for producing an instantly edible, synthesized, cohesive powder bit rice product which can be rehydrated and rendered edible merely upon the addition of an edible liquid consisting essentially of the steps of:
   (a) crushing or comminuting rice grains to form a rice powder;
   (b) forming an extrudable dough comprising approximately: 74.3% rice powder by weight; 1.3% sodium alginate by weight; 1.2% peanut oil by weight; 0.3% lecithin by weight; 0.6% albumin by weight; and, 22.3% water by weight, wherein the rice flour, sodium alginate, peanut oil, lecithin and albumin are throughly blended for approximataly 10 minutes and the water is added to the blended mixture and throughly mixed for approximately 5 minutes;
   (c) extruding the extrudable dough produced in Step (b) through a pressure extruding press containing a standard Risso die so as to produce strings of dough material;
   (d) cutting the strings of doughy material produced in Step (c) at intervals to form rice containing kernels;
   (e) depositing the formed rice containing kernels produced in Step (d) in boiling water containing approximately 0.25% calcium chloride by weight and approximately 0.15 % calcium lactate by weight, and cooking the rice containing kernels for approximately 8 to 10 minutes until fully gelatinized;
   (f) rinsing and cooling the gelatinized rice containing kernels;
   (g) thoroughly freezing the rice containing kernels; and,
   (h) drying the frozen rice containing kernels to reduce the moisture content thereof to approximately 12% by weight.

2. The process defined by claim 1 wherein at least some of the rice grains are broken.

3. The process defined by claim 1 where the synthesized cohesive powder bit rice product is fortified by the addition of at least one of the fortifying agents selected from the group consisting of:
   (a) vitamins;
   (b) minerals;

(c) proteins;
(d) amino acids;
(e) fats;
(f) oils;
(g) medicaments; and,
(h) flavorings;

with such selected fortiying agent(s) being added to the extrudable dough formed in Step (b).

* * * * *